3,139,839
TRANSFER APPARATUS SYSTEM
James E. Ashworth, Palo Alto, Calif., assignor to United States Steel Corporation, a corporation of New Jersey
Filed Dec. 11, 1962, Ser. No. 243,937
1 Claim. (Cl. 104—130)

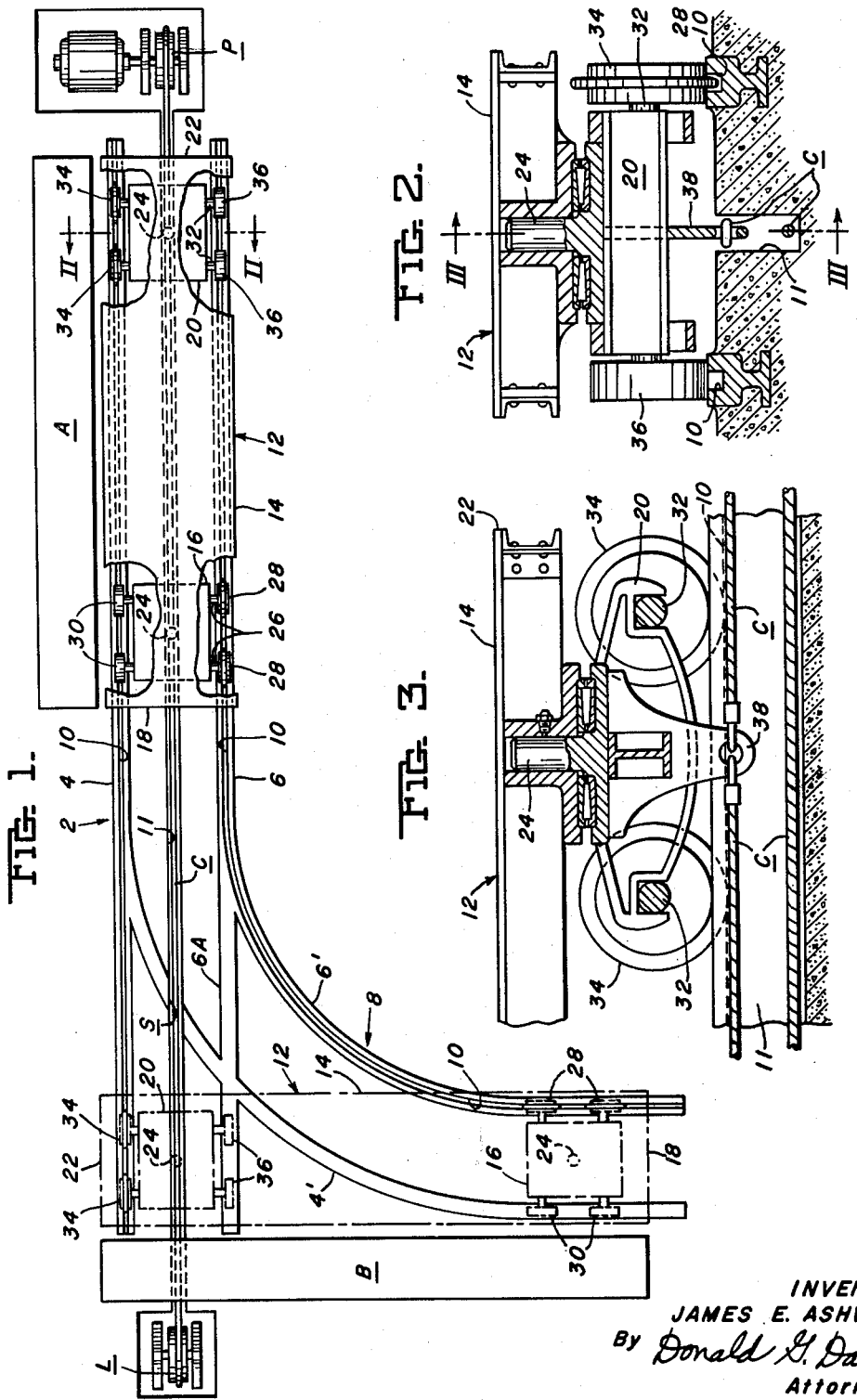
July 7, 1964     J. E. ASHWORTH     3,139,839
TRANSFER APPARATUS SYSTEM
Filed Dec. 11, 1962
INVENTOR.
JAMES E. ASHWORTH
By Donald G. Dalton
Attorney United States Patent Office 3,139,839
Patented July 7, 1964

The present invention relates generally to the handling of material and more particularly has as its primary object the provision of an improved apparatus system effective to transfer articles from one location to another by means of a transfer car.

Another object of the invention is the provision of a transfer apparatus system including a transfer car and a trackway of unique design whereby the transfer car is turned angularly from its original position as it moves from one location to another along the trackway.

It is a further object of the invention to provide a transfer apparatus system including a transfer car and trackway of unique design whereby the transfer car is positively positioned in the same location each time it is moved along the trackway from a loading station to an unloading station.

This and other objects will become more apparent after referring to the following specification and attached drawings, in which:

FIGURE 1 is a plan view of the transfer apparatus system of the invention showing the transfer car in loading position in solid lines with parts broken away for clarity and in unloading position in broken lines;

FIGURE 2 is a cross-sectional view taken along the line II—II of FIGURE 1; and

FIGURE 3 is a sectional view taken along the line III—III of FIGURE 2.

Referring more particularly to the drawing reference numeral 2 designates a trackway consisting of a pair of spaced parallel rails 4 and 6 and a spur 8 consisting of rails 4' and 6' branching from the trackway adjacent one end thereof. Rail 4' of spur 8 extending from rail 4 and rail 6' of spur 8 extending from rail 6. A longitudinal groove 10 is provided in the upper surface of each of the rails 4, 6 and 6'. Groove 10 extends along the entire length of rails 4 and 6'. Rail 4' and the portion 6A of rail 6 which extends beyond rail 6' are provided with smooth, ungrooved upper surfaces. A cable slot 11 extends longitudinally along the bed of the trackway between and parallel with the rails 4 and 6 for accommodating an endless propelling cable C which will be further described hereinafter. The portion of rail 4' which passes over the slot 11 is split transversely as as S so as to provide unobstructed access along the slot 11 for a purpose which will become apparent.

A transfer car 12 is mounted for rolling movement along the trackway 2. Car 12 includes a load-bearing body 14 mounted on a freely swiveling wheel truck 16 adjacent its forward end 18 and on a freely swiveling wheel truck 20 adjacent its rearward end 22. Each of the trucks 16 and 20 is fastened to the body 14 by means of a swivel trunnion pin 24.

Forward truck 16 is provided with a pair of transversely disposed axles 26 each of which carries a center flanged wheel 28 on one end and a plain wheel 30 on its other end. Rearward truck 20 is similarly provided with a pair of transversely disposed axles 32 each of which carries a center-flanged wheel 34 on one end and a plain wheel 36 on its other end. Flanged wheels 28 are on one side of the truck 16 and run along rails 6 and 6' while flanged wheels 34 are disposed on the opposite side of truck 20 and run along rail 4. Plain wheels 30 of truck 16 run along rail 4 and 4' while plain wheels 36 of truck 20 run along rails 6 and 6A.

A cable support plate 38 is welded or otherwise rigidly fastened to and depends from the underside of the swivel trunnion pin 24 of the rearward truck 20. The bottom portion of the cable support plate 38 projects downwardly into the slot 11 and is there fastened to the cable C. The cable C is propelled by means of a reversible power driven pulley P disposed at one end of the trackway 2 and travels around an idler sheave L disposed adjacent the opposite end of the trackway. Thus, the cable C serves to propel the car 12 in either direction along the trackway. The cable C is not attached to the forward truck 16.

If desired, the car 12 may be self-propelled or propelled by suitable means other than a driven cable.

In operation, the car 12 is positioned at loading station A adjacent the end of trackway 2 remote from spur 8. In this position the longitudinal axes of trucks 16 and 20 are parallel with the longitudinal axis of the car 12. After a load of material has been loaded onto the car, the car is propelled along the trackway 2 toward the unloading station B adjacent the end of the trackway remote from the loading station A. In order that the material can be unloaded by the mechanical equipment (not shown) at the unloading station, it is necessary that the transfer car be in a position turned 90 degrees from its position at the loading station. Such turning is effected by cooperation of the flanged wheels, the grooves in the rails of the trackway, and the spur branch of the trackway. In moving from the loading station A toward unloading station B, flanged wheels 28 on forward truck 16 are guided by grooves 10 along rails 6 and and 6' while flanged wheels 34 on rearward truck 20 are guided by groove 10 along rail 4. Thus, forward truck 16 follows the curvature of spur 8 and turns out from the straight portion of trackway 2 and rearward truck 20 travels straight along trackway 2 from one end to the other thereof. When the transfer car 12 has reached the unloading station, the body of the car and truck 16 have turned 90 degrees from their positions at the loading station. At the unloading station, the longitudinal center line of the car 12 is disposed at an angle of 90 degrees to the longitudinal axis of the rearward truck 20.

After truck 16 has turned out on the spur 8 and the body of the car is turned at 90 degrees relative to the longitudinal axis of the rearward truck 20, the car stops. The relative positions of the trucks 16 and 20 prevent further movement of the car in the direction away from the loading station so that the car is automatically positioned at exactly the same location each time.

It should now be apparent that I have provided an improved transfer apparatus system including a transfer car and a trackway of unique design whereby the transfer car is automatically turned angularly from its original position as it moves from one location to another along the trackway without the necessity of track switches, frogs or conventional crossovers. It should be further apparent that I have provided a transfer apparatus system including a transfer car and trackway of unique design whereby the transfer car is positively positioned in the same location each time it is moved along the trackway from a loading station to an unloading station adjacent the trackway.

While one embodiment of my invention has been shown and described, it will be apparent that other adaptations and modifications may be made without departing from the scope of the following claim.

I claim:

A transfer apparatus system comprising a trackway consisting of a pair of spaced parallel straight rails, one of said rails having a groove in the upper surface thereof extending along its full length, the other one of said rails having a grooved upper surface extending along a portion of its length and a smooth upper surface along the remainder of its length, a car mounted for movement along said trackway, means for propelling said car along said trackway, said car including a pair of freely-swiveling wheel trucks, one at the forward end of said car and one at the rearward end thereof, a wheel axle disposed transversely in each of said trucks, a flanged wheel on one end and a wheel having a cylindrical tread surface on the other end of each of said axles, a spur branching from said trackway adjacent one end thereof, one of the rails of said spur extending from the grooved portion of said other one of said rails of said trackway and having a groove in its upper surface extending along the length thereof, the other rail of said spur having a smooth upper surface, said remainder of said other one of said rails of said trackway extending beyond said one of the rails of said spur and across the other one of said rails of the spur, the flanged wheel of said forward truck running first along said grooved portion of said other one of said rails of said trackway and then along the grooved rail of said spur with its flange received in the grooves thereof and said other wheel of said forward truck running first along said one of said rails of said trackway with its cylindrical tread surface overlying the groove therein and then along said other one of said rails of said spur as said car is propelled along said trackway from the end thereof remote from its said one end, said flanged wheel of said rearward truck running along said one of said rails of said trackway with its flange received in the groove thereof and the other wheel of said rearward truck running first along said grooved portion of said other one of said rails of said trackway with its cylindrical tread surface overlying the groove therein and then along said remainder of said other one of said rails of said trackway as said car is propelled along said trackway from the end thereof remote from its said one end.

References Cited in the file of this patent
UNITED STATES PATENTS

| | | |
|---|---|---|
| 30,100 | Wharton | Sept. 18, 1860 |
| 364,033 | Messier | May 31, 1887 |
| 583,353 | Anderson | May 25, 1896 |
| 727,919 | Ellery | May 12, 1903 |
| 2,884,870 | Day | May 5, 1959 |